United States Patent Office 3,572,198
Patented Mar. 23, 1971

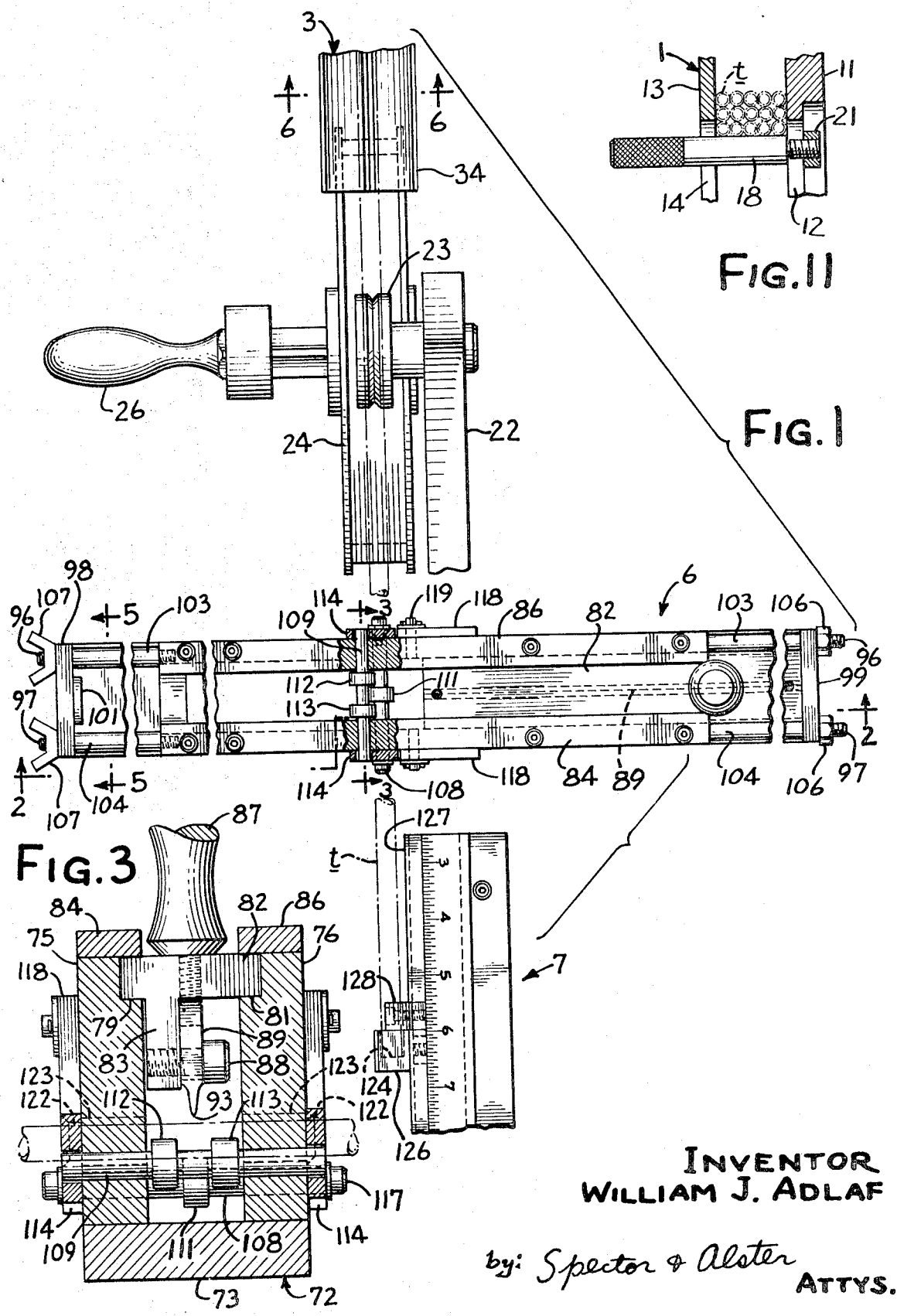

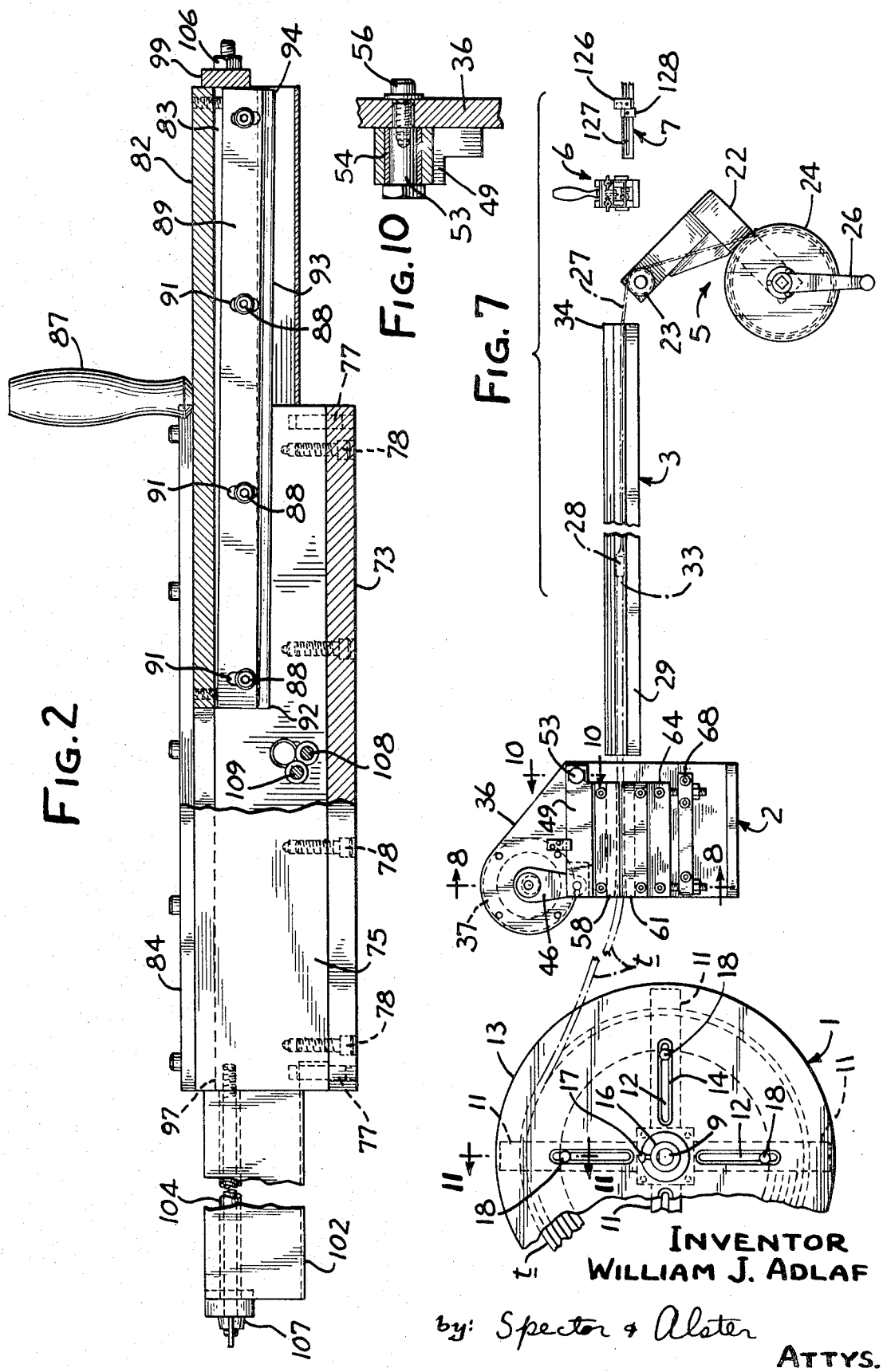

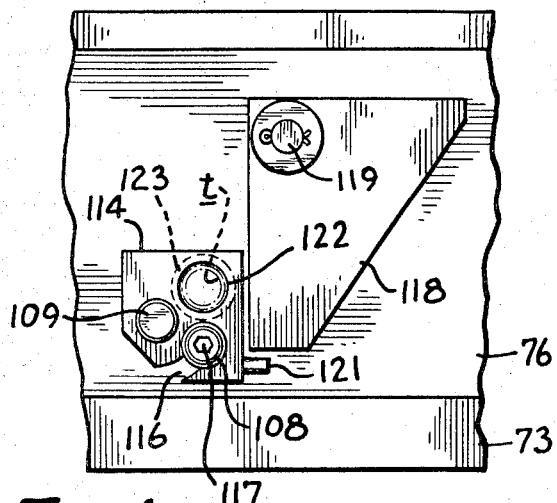
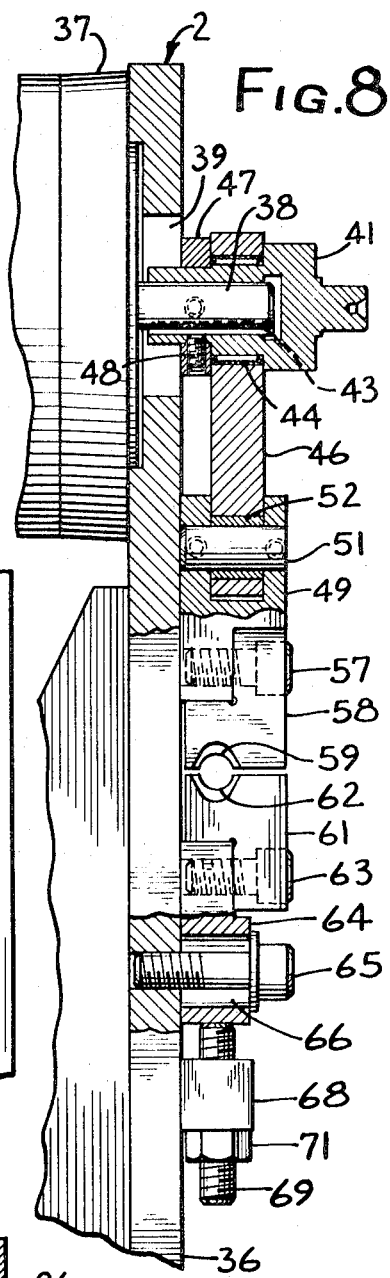
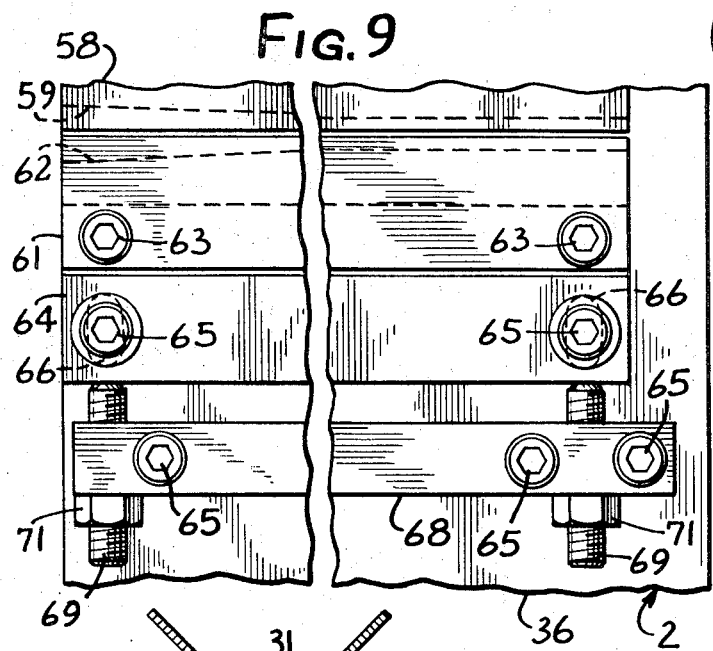
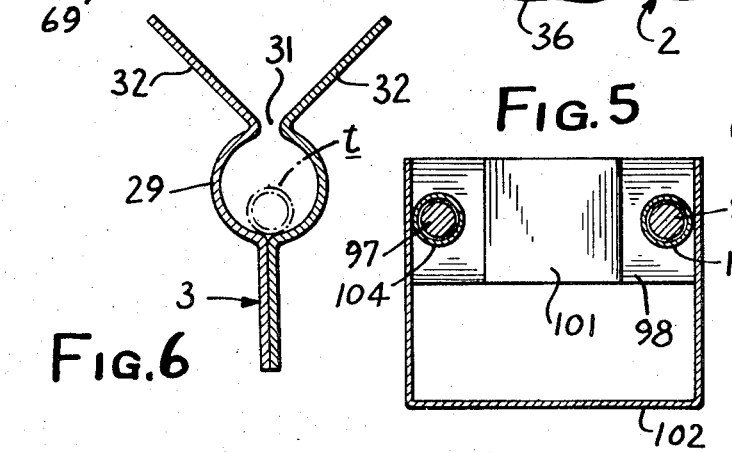

3,572,198
APPARATUS AND METHOD FOR CUTTING
STOCK MATERIAL
William J. Adlaf, North Riverside, Ill., assignor to
Esterline Corporation, Broadview, Ill.
Filed Mar. 11, 1968, Ser. No. 712,153
Int. Cl. B23b 5/14, 3/04
U.S. Cl. 82—47                                    5 Claims

ABSTRACT OF THE DISCLOSURE

Apparatus for handling and cutting metal tubing comprises a reel upon which a coil of tubing may be placed and a device that straightens the tubing as it is withdrawn from the reel and is moved into an elongated housing that stores the straightened tubing. The tubing may then be advanced, as desired, through a fixture to cut off selected tube lengths from the supply. The housing keeps the remaining supply of tubing from being bent. The fixture supports the tubing for rotation about its longitudinal axis and includes a knife that is drawn over the tubing transversely thereof. The frictional engagement of the knife with the tubing rotates the latter and the disposition of the cutting edge of the knife is such as to increase progressively the depth of cut as the knife moves through a predetermined path.

This invention relates to an apparatus and method for cutting stock material, such as tubing or the like.

It is an object of this invention to provide an apparatus and method for cutting off lengths of stock material such as metal tubing, from a supply of such stock material, and wherein the stock is supported for rotation substantially about its longitudinal axis in a fixture and, further, wherein a knife in the fixture is drawn over the stock in a plane perpendicular to that longitudinal axis and in such rectilinear path that there results a rotation of the stock material by the frictional engagement of the cutter and the stock and a progressively increasing depth of cut into the stock as the knife continues to rotate the same. The cutting edge of the knife is preferably at a small angle to the general direction of the path and is of such length that the cutting edge initially engages the stock tangent thereto, and upon drawing the knife across the stock in a single stroke, the knife cuts through the stock. Where the stock is tubing, the aforesaid angle and length of the cutting edge need only be such as to cut through the wall thickness of the tubing.

It is a further object of the invention to provide a stock cutting fixture of the type stated having stock guides that cooperate with rollers in the fixture for rotatably supporting the stock tubing and preventing lateral translation of the stock out of cutting position. At the same time, the stock guides are free-floating within limits to compensate for stock that is slightly out of round or slightly bent. The stock guides are also readily removable and replaceable for different sizes of stock to be cut.

It is another object of this invention to provide, as part of the apparatus, an elongated support-forming housing for storing a supply of stock and from which the stock may be advanced through the fixture a predetermined amount so that the fixture may be used to cut off a measured amount of the stock.

The stock material is preferably of a known length, for instance about fifty feet. It is generally coiled for convenience of handling. Initially, the coil is loaded onto a stock reel that forms part of the apparatus of the invention. The full length of the stock is thereafter withdrawn from the reel for storage in the housing preparatory to feeding through the cutting fixture. However, when the stock is uncoiled from the reel, it is not straight and must be straightened prior to loading into the storage housing. Accordingly, it is an object of this invention to provide a novel device for straightening the stock as it is uncoiled from the stock reel and is advanced into the storage housing. This straightening device preferably comprises a motor-driven reciprocating hammer and a cooperating anvil that is adjustable relative to the hammer, the stock being pulled between the hammer and the anvil and into the storage housing.

The attainment of the above and further objects of the invention will be apparent from the following description taken in conjunction with the accompanying drawing forming a part thereof.

In the drawing:

FIG. 1 is a fragmentary top plan view, partially broken away and in section, of a portion of the apparatus constructed in accordance with and embodying the present invention;

FIGS. 2 and 3 are fragmentary sectional views taken along lines 2—2 and 3—3, respectively, of FIG. 1;

FIG. 4 is a fragmentary front-elevational view of a portion of the tube-cutting fixture of FIG. 1 and showing one of the stock guides and its associated stop;

FIG. 5 is a sectional view taken along line 5—5 of FIG. 1;

FIG. 6 is a fragmentary sectional view taken along line 6—6 of FIG. 1;

FIG. 7 is a fragmentary elevational view of the apparatus;

FIG. 8 is a fragmentary sectional view, on an enlarged scale, taken along line 8—8 of FIG. 7;

FIG. 9 is a fragmentary front-elevational view of a portion of the structure of FIG. 8; and FIGS. 10 and 11 are fragmentary sectional views, each on an enlarged scale, taken along lines 10—10 and 11—11, respectively, of FIG. 7.

Referring now in more detail to the drawing and in particular to FIG. 7, there is shown apparatus for handling and cutting metal tubing $t$. Generally speaking, the apparatus comprises a stock reel 1 upon which may be loaded a known length of tubing $t$ (for instance, a fifty foot length), a tube straightener 2, an elongated housing 3 for storing the tubing $t$ after it has been withdrawn from the supply reel 1 and has passed through the straightener 2, a mechanism 5 for pulling the tubing $t$ through the straightener 2 and into the housing 3, a tube cutoff fixture 6, and a graduated stop-guide assembly 7 for determining the length of tube to be cut off by the fixture 6. The reel 1 rotates about the axis of the reel shaft 9, which may be journalled in a known manner. The reel shaft journal, the straightener 2, the housing 3, the stock puller 5, the cutting fixture 6 and the graduated stop-guide assembly 7 are all suitably mounted on a common base or frame (not shown) so that these components of the apparatus remain in fixed relationship.

Referring to FIGS. 7 and 11, the stock reel 1 has a side member that comprises four equally spaced radial arms 11, each having a radial slot 12 therein. The other side of the reel 1 is formed by a removable disc 13 having clearance slots 14 that may be aligned with the corresponding slots 12 on the arms 11. The disc 13 has a hub 16 with a thumb screw 17 by which the disc 13 may be secured to and removed from the shaft 9. Pins 18 project through the slots 12, 14 and may be adjustably positioned along the length of those slots. For this purpose, one end 19 of each pin 18 may be diametrally reduced and threaded where the pin passes through the slot 12, each pin 18 being secured to its associated arm 11 by a nut 21. The end of each pin 18 that projects through the slot 14 may be knurled to facilitate gripping the same so that each pin 18 may be loosened by rotation thereof and then slid along the slot 12 to a desired position and then retightened in place.

The tubing *t* is usually in the form of a coil, the diameter of which may vary considerably depending upon how neatly the tubing *t* is coiled and the nominal diameter of the tubing itself. However, to mount a supply of tubing onto the reel 1, the thumb screw 17 is loosened allowing the disc 13 to be removed from the reel shaft 9. The coil of tubing *t* is then placed on the pins 18 which may then be loosened and moved along the slots 12 to bring them substantially snugly to the inside diameter of the coil of tubing. Then the pins 18 may be tightened and the disc 13 remounted onto the reel shaft 9 with the pins 18 projecting through the slots 14.

The tubing *t* is pulled through the hereinafter described straightening device 2 and into the housing 3 by the pulling device 5 that comprises a fixed bracket 22 to which a pulley 23 and a drum 24 are rotatably mounted, the drum 24 having a crank 26. A wire or cable 27 is secured at one end to the drum 24 and at its other end is a conventional gripping device 28 of a type which may be releasably secured to the tubing *t*. The housing 3, which is preferably the same length as that of the tubing *t*, has a tube-like portion 29 (FIG. 6) of a diameter that is considerably greater than the maximum diameter of tubing *t* with which the apparatus is intended to be used. The upper end of the portion 29 has an opening 31 for the full length thereof, and on either side of the opening are outwardly diverging flanges 32, 32. The opening 31 allows the unwound cable 27 to be dropped into the portion 29 so that the gripper 28 may be attached to the lead end 33 of the tubing *t* as it comes from the straightening device 2. With the straightening device 2 in operation, the crank 26 may be operated to wind the cable 27 onto the drum and thereby pull the tubing into the housing portion 29. The lead end 33 of the tubing will be pulled to the end 34 of the housing 3 that is adjacent to the cut-off fixture 6, at which time the tubing *t* will lie wholly within the housing 3. Thereafter, the gripper 28 may be removed.

Referring now to FIGS. 7, 8 and 10, the straightening device 2 comprises an L-shaped frame 36, the upper end of which has an electric motor 37 bolted thereto. The motor shaft 38 projects through a hole 39 in the frame 36 and has an eccentric 41 secured thereto by a key 43. Journalled on the eccentric 41 by a bearing 44 is a crank 46 that has a vertical stroke as determined by the throw of the eccentric 41. A collar 47 may also be secured to the eccentric 41 adjacent to the crank 46 by one or more set screws 48. The lower end of the crank 46 projects into a bifurcated upper corner of a hammer support 49. A pin 51 is secured as by set screws to the bifurcated part of the hammer support 49 and the crank 46 is journalled on the pin 51 by a bearing 52. The other upper corner of the hammer support 49 also has a pin 53 passing therethrough and which is surrounded by a bearing 54 for rockably mounting the hammer support 49 onto the frame 36. The pin 53 is retained onto the frame 36 by a cap screw 56 which is threaded axially into the pin 53.

Secured to the hammer support 49 by screws 57 is a die or hammer 58 having a die cavity 59. Provided for cooperation with the hammer 58 is another die or anvil 61 having a companion die cavity 62 that opens toward the die cavity 59. The anvil 61 is secured by screws 63 to an anvil support 64. Mounting the anvil support 64 onto the frame 36 are the screws 65 which pass through elongated holes 66 in the anvil support 64 and are threaded into the frame 36. Below the anvil support 64 is a block 68 that is secured by screws 65 to the frame 36. Spaced apart studs 69 are threaded through the block 68 so that the upper ends of the threaded studs 69 engage the lower sides of the anvil support 64. Nuts 71 are threaded onto the studs 69 to assist in maintaining them in their adjusted positions.

By turning the studs 69, the vertical position of the anvil support 64 and anvil 61 may be adjusted within the limits of the elongated holes 66. Adjustment of the anvil 61 may be made for any desired purpose, for instance when the anvil 61 and hammer 58 are changed to provide die cavities 59, 62 of different sizes in accordance with the nominal diameter of tubing *t*. When tubing *t* passes between the hammer and anvil, the blows on the anvil from the reciprocating hammer are transmitted to the studs 69, 69.

Referring to FIG. 9, the die cavities 59, 62 taper from the left hand or inlet side of the device 2 to the discharge side wherein the closed dies will form a die cavity having a diameter approximately that of the external diameter of the tubing *t*. The tubing is hand-fed through the dies to start with until a piece thereof projects outwardly through the discharge end of the dies an amount sufficient to enable the gripper 28 to be fastened to the tubing *t*. Thereafter, the tubing *t* is pulled slowly by the device 5 between the reciprocating hammer 58 and the fixed anvil 61 so that for each revolution of the motor shaft 38 the hammer 58 will exert a blow against the anvil 61. When the tubing *t* has been loaded into the housing 3, the motor 37 is shut off.

The tube cut-off fixture 6 comprises a base 72 having a base plate 73 and spaced parallel side members 75, 76. Each side member 75, 76 is secured to the base plate 73 by dowel pins 77 (FIG. 2) and screws 78. Adjacent to their upper ends, the side members 75, 76 have slide surfaces 79, 81 that extend longitudinally throughout the full lengths of the side members 75, 76. An elongated knife holder 82 slides along the slide surfaces 79, 81 and has a leg 83 that lies in the cavity between the side members 75, 76. Caps 84, 86 are bolted to the top surfaces of the side members 75, 76 to prevent vertical retraction of the knife holder 82 from its slide supports 79, 81. A handle 87 is threaded into the knife holder 82 centrally thereof and projects upwardly therefrom.

Secured to the face of the knife holder leg 83 by bolts 88 is a knife 89 which is approximately coextensive in length with the leg 83. The knife 89 is preferably midway between the side members 75, 76 and it also has elongated holes 91 whereby the position and angularity with respect to the holder 82 may be adjusted when the two are assembled. Assuming the slides 79, 81 to be horizontal, the path of the movement of the holder 82 and knife 89 is horizontal. However, the knife 89 is inclined a small angle to the horizontal so that the leading end 92 (FIG. 2) of the knife's cutting edge 93 is slightly higher than the trailing end 94 of the cutting edge 93, for purposes presently more fully appearing.

Threaded into the opposite ends of the side members 75, 76 are two sets of studs 96, 97, each pair of which supports a stop 98, 99 for the forward and return strokes of the knife and its holder. The stop 98 may have a cushioning element 101 against which the knife holder strikes upon completion of the forward or tube-cutting stroke. Each stop 98, 99 is supported in spaced relation to the associated end of the cut-off fixture base 72 by a U-shaped member 102 (FIG. 5), the sides of which are reinforced by tubes 103, 104 that surround the studs 96, 97 that mount the return stroke stop 99 while wing nuts 107 hold the forward stroke stop 98 in mounted position. The wing nuts 107 may be easily removed to withdraw the stop 98 from its associated studs 96, 97 to permit removal of the knife and knife holder assembly so that it may be changed as a unit for different sizes of tubing to be cut.

Mounted in the side members 75, 76 and spanning the space therebetween are fixed shafts 108, 109, the lower shaft 108 supporting a roller 111 and the upper shaft 109 supporting spaced-apart rollers 112, 113. On each side member 75, 76 is a stock guide 114 which has a mounting hole that rotatably receives the end of a shaft 109 so that the latter constitutes a pivot pin for each of the guides 114. Each guide 114 has an arcuate slot 116 (FIG. 4) through which a retainer screw 117 projects, the retainer screw 117 being threaded axially into the lower shaft 108. The screw 117 prevents retraction of the guide 114 from its pivot mounting 109 so long as the screw 117 is within the slot 116. However, the screw 117 is not tightly held against the guide 114 so that the latter may rock, within limits, about the axis of shaft 109.

Stock guide stops 118, 118 are mounted for free-floating pivotal movement on the side members 75, 76 by pins 119, 119 that are secured to the side members 75, 76. The stops normally are in the positions shown in FIGS. 1, 3 and 4. Each stock guide 114 has a short stop pin 121 (FIG. 4) that underlies the stop 118 so that any pivotal movement of the stock guide 114 counterclockwise is limited by the engagement of the pin 121 with the stop 118 and is limited in the other direction by the engagement of the retainer screw 117 with the upper or closed end of the arcuate slot 116. Each stock guide 114 has a stock clearance hole 122 that is slightly larger in diameter than the outer diameter of the tubing $t$ that is within the housing 3. A different stock guide 114 is used for each size of tubing, other stock guides being the same as those illustrated except for the size of the stock clearance hole 122 which will vary in accordance with the size of tubing to be cut. The side members 75, 76 also have stock clearance holes 123, 123 (FIG. 3) that are large enough to accommodate the maximum size of tubing for which the tube cut-off fixture 6 is to be used.

Each stock guide 114 is readily removed by swinging the stop 118 counterclockwise (FIG. 4) an amount such that when the stock guide 114 is thereafter swung counterclockwise, the short stop pin 121 will clear the stop 118. When the stop 118 has been so swung until the retainer screw 117 is clear of the slot 116, the stock guide 114 may be simply slipped off of the shaft end 109. Likewise, a new stop guide is installed by mounting it onto the shaft 109, allowing the stock guide 114 to swing clockwise until the screw 117 abuts the end of the slot 116, and then allowing the stop 118 to swing clockwise downwardly to its normal position.

To cut a length of tube from the tubing $t$, the latter is grasped and inserted through the stock clearance holes 122, 123 till the end of the tubing seats in the cavity 124 of a stop 126 which is slidable in a slot 127 adjacent to the graduated indicia shown in FIG. 1. A gauge stop 128 constitutes an abutment up to which the stop 126 may be shifted, the gauge stop 128 being held in place by its set screw at a selected graduation of the scale corresponding to the tube length to be cut off. Since the actual length of tube cut off will be measured from the cutting edge 93 to the end wall of the cavity 124, the location of the graduated indicia takes into account the depth of the cavity 124.

The tubing $t$ will be supported by the rollers 111, 112, 113, as well as at the stop 126 and in the supply housing 3. This tube-supporting arrangement will permit rotation of the tubing $t$. To cut the tubing, the handle 87 is grasped and the knife and its holder are moved quickly from the positions shown in FIGS. 1 and 2 to the right until the knife holder 82 strikes the stop cushion 101. The knife 89 lies substantially in a plane that is perpendicular to the axis of the tubing $t$, and during the movement of the knife the cutting edge 93 will initially engage the periphery of the tubing $t$ after which the tubing $t$ will rotate about its axis due to the frictional engagement of the knife edge 93 with the tubing and the support by the rollers 111, 112, 113 of the periphery of the tubing $t$. As the knife 89 progresses in its cutting stroke, it continues to rotate the tubing and progressively cut deeper and deeper into the wall of the tubing $t$ until finally the tube wall is cut completely through before the knife has reached the end of its cutting stroke.

The progressively deeper cutting of the tubing as it rotates is due to the angular disposition of the cutting edge 93 relative to the path of movement of the knife and holder assembly. Thus, the knife and holder assembly moves along a path defined by lines parallel to the slides 79, 81 and the cutting edge 93 is at an acute angle to the parallel lines of that path.

The stock guides 114 cooperate with the rollers 111, 112, 113 to maintain the tubing in proper cutting position and thus prevent the tube from being laterally shifted over the rollers 112, 112 by the driving action of the knife. Furthermore, the fact that the stock guides 114 are free-floating, within limits, about their pivot axes compensates for any out-of-roundness or lack of straightness in the piece of tubing being cut.

After the piece of tubing has been cut, the slidable stop 126 is moved away from the gauge stop 128 allowing clearance for the cut tube to be moved axially and withdrawn from the fixture 6. The end of the tubing $t$ that remains has an end that is at the plane of cut. When another and subsequent cut lengths of tube are desired, the tubing is simply advanced axially by hand up to the slidable stop 126, which is held against the gauge stop 128, after which the knife is moved through its cutting path in the manner described.

The precise constructions herein shown are merely illustrative of the principles of the invention. What is considered new and sought to be secured by Letters Patent is.

What is claimed is:

1. Apparatus for cutting stock material comprising rollers that rotate about axes that are mounted parallel to a longitudinal axis of a stock material reception zone which is concident with stock material to be cut such that said rollers are engageable with the periphery of stock material, a cutter knife having an edge mounted in a plane substantially perpendicular to said longitudinal axis and wherein said edge extends in a path transversely to said axis, knife holder means mounting said cutter knife for rectilinear movement in said path, means for moving said cutter in said path, and guiding means cooperating with said rollers for inhibiting lateral translation of stock material in the region of cut whereby stock to be cut is engaged on its periphery by said rollers and is rotated thereon by progressive increase of depth of cut of the knife edge as it is advanced along the said rectilinear path during the cutting operation.

2. Tube cutting apparatus comprising a fixture having a base, means comprising rollers mounted on said base for rotatably supporting a tube at its periphery for rotation substantially about its longitudinal axis, a knife that is substantially in a plane that is perpendicular to the axes of rotation of said rollers and terminating in a cutting edge, a holder slidable on said base for carrying said knife in said plane and along a path defined by parallel lines that are at an acute angle to said cutting edge, means for moving said holder along said base to cause said cutting edge to engage the tube tangentially and cause it to rotate while the cutting edge passes thereacross and progressively increases the depth of cut while continuing to rotate the tube, and stock guiding means cooperating with said rollers for inhibiting lateral translation of said tube in the region of the cut during the cutting operation.

3. Apparatus according to claim 2 in which the length of said cutting edge that traverses said tube and the magnitude of said acute angle are such that the tube is cut through its wall thickness entirely around its periphery upon a single pass of said cutting edge across the tube.

4. Apparatus according to claim 3 further including means adjacent to said fixture for storing a supply of tubing, means for supporting a reel of coiled tubing, and means for withdrawing the tubing from a supply reel that is on said supporting means and transferring the tubing to said storing means, and means for straightening the tubing as it is withdrawn from the supply reel by said withdrawing means.

5. Apparatus according to claim 2 further including means on one side of the plane of said knife for supporting a supply of tubing, and means on the opposite side of the plane of said knife and having a stop abutment for receiving an end of the supply of tubing.

References Cited

UNITED STATES PATENTS

| | | | |
|---|---|---|---|
| 1,679,977 | 8/1928 | Knudsen | 82—70.1 |
| 2,268,820 | 1/1942 | Hannan | 82—83 |
| 3,084,578 | 4/1963 | Hartford | 82—60 |
| 3,107,564 | 10/1963 | Coker et al. | 82—46X |
| 3,429,211 | 2/1969 | Pelot | 82—46 |

FOREIGN PATENTS

| | | | |
|---|---|---|---|
| 1,234,295 | 5/1960 | France | 82—46 |
| 512,117 | 8/1939 | Great Britain | 82—47 |

HARRISON L. HINSON, Primary Examiner

U.S. Cl. X.R.

82—70.1, 101